Oct. 26, 1971    R. L. WEBB ET AL    3,614,970
MEAT CUBING MACHINE

Filed March 28, 1969    5 Sheets-Sheet 1

INVENTORS
RODGER L. WEBB
BY   WILLIAM A. VAUGHT

Bertha L. MacGregor
ATTORNEY

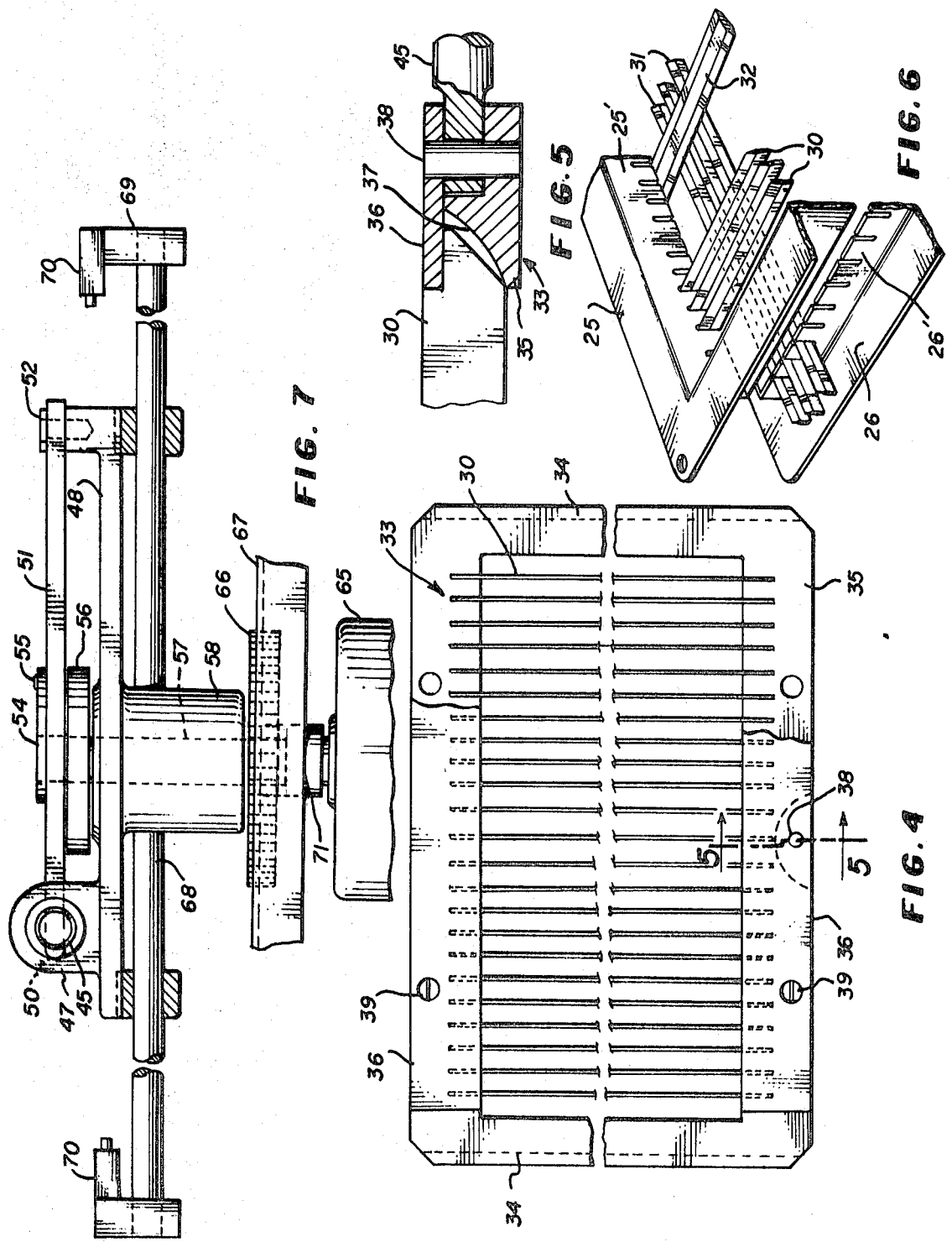

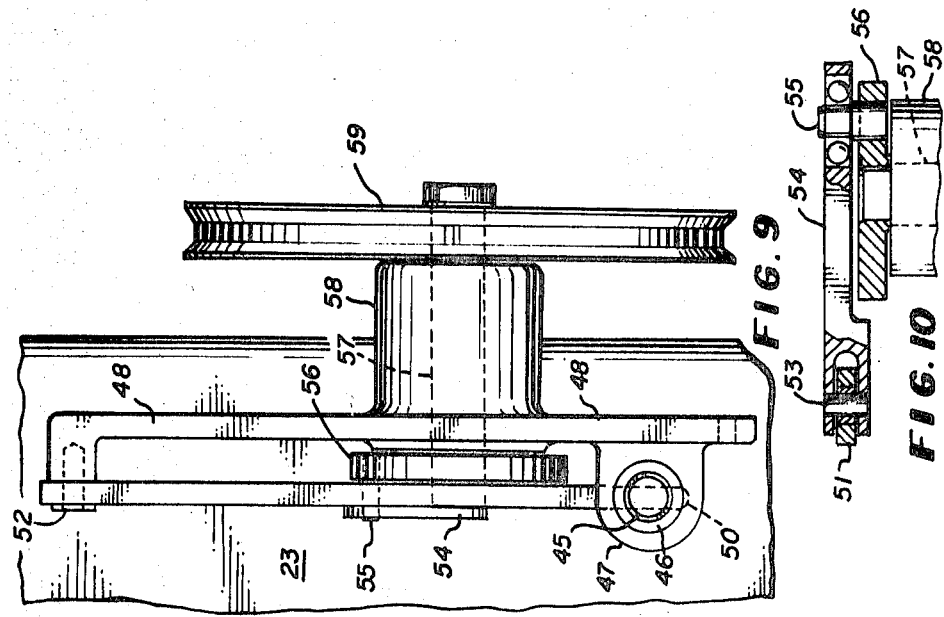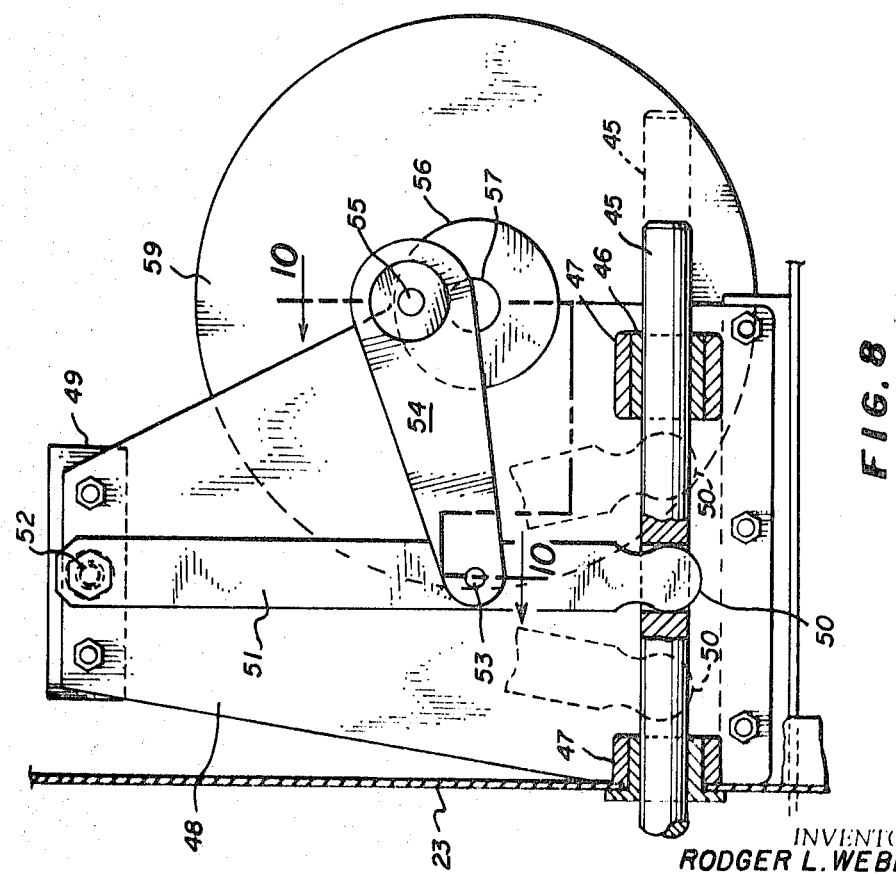

INVENTORS
RODGER L. WEBB
WILLIAM A. VAUGHT
BY Bertha L. MacGregor
ATTORNEY

United States Patent Office 3,614,970
Patented Oct. 26, 1971

3,614,970
MEAT CUBING MACHINE
Rodger L. Webb, Englewood, and William A. Vaught, Denver, Colo., assignors to Denley Enterprises, Inc., Golden, Colo.
Filed Mar. 28, 1969, Ser. No. 811,402
Int. Cl. B02c 18/04; B26d 4/02
U.S. Cl. 146—78 A                 8 Claims

ABSTRACT OF THE DISCLOSURE

A cubing machine comprising a housing including a cutting chamber, first and second framed sets of vertically disposed, parallel, transversely spaced apart knife blades, one set above the other, with the blades of one set extending longitudinally at right angles to the blades of the other set and positioned in the cutting chamber with their cutting edges supporting the meat. Means for reciprocating the blades in opposite directions are located outside of the cutting chamber and operatively detachably connected to each frame. A horizontally disposed double edged blade, located between the framed sets, is provided with means for reciprocating the blade longitudinally and for moving the blade bodily across the cutting chamber in a horizontal plane through the meat. The blades are easily removable from their frames, and the frames are detachable from their reciprocating mechanisms. The reciprocating mechanisms for actuating the framed sets of blades and the cut-off blade comprise similar parts which reduce cost of production and facilitate assembly and detachment of parts.

---

This invention relates to a cubing machine and more particularly to a machine for cutting meat into cubes of uniform, predetermined size. The machine may be used for cubing material other than meat, but will be described herein as designed primarily for converting large pieces of meat into cubes of desired dimensions.

The construction herein shown and described is an improvement of the machine which is the subject of the application of Rodger L. Webb, Ser. No. 675,916, filed Oct. 17, 1967, now U.S. Pat. No. 3,506,046, Apr. 14, 1970.

The main object of the invention is to provide a compact efficient machine in which the meat is maintained in sanitary condition while it is being cubed. Another object is to provide a machine in which the meat is supported by the cutting edges of the blades which perform the cutting as the meat passes downwardly during the cubing operation under the influence of gravity.

The cutting blades are compactly located in a cutting chamber in the housing through which the uncut meat passes downwardly to rest on the cutting edges of the blades.

In the embodiment of the invention shown herein, a first set of vertically extending, parallel, transversely spaced apart cutting blades are removably mounted in a frame. The frame is detachably and operatively connected to means for imparting longitudinal reciprocation in opposite directions to the frame and blades therein. The cutting edges of the blades enter the bottom of the meat piece to be cubed. If one inch cubes are to be produced, the blades will be transversely spaced apart one inch, and the meat will move downwardly to permit cutting into the meat to a depth which will produce unsevered parallel strips which depend one inch below the cutting edges of the blades of the first set of blades.

Beneath the said first set of blades is a double edged cut-off blade horizontally disposed to slice across the unsevered strips for the purpose of severing them from the piece at a predetermined depth.

A second set of framed blades is like the first set, but extends in the cutting chamber at right angles to the blades of said first set. It is located beneath the horizontally disposed cut-off blade. This second set of blades, in the embodiment herein shown and described, cuts across the previously cut and severed strips. The resultant cubes fall by gravity into a bin located in the housing.

The means for imparting reciprocatory movement in opposite directions longitudinally to the blades of the two sets of blades may be independent of each other or operatively connected to reciprocate the sets of cutting blades, the reciprocation being approximately three inches in each direction. The cutting edges may be serrated or plain.

The blades which touch the meat are located in a cutting chamber separate from the rest of the housing, and the mechanisms which reciprocate the sets of blades and reciprocate and bodily move the cut-off blade are located outside of the cutting chamber. The blades are quickly and easily removed from their frames and the frames and cut-off blade are readily detachable from the operative mechanisms for cleansing purposes.

The three reciprocating mechanisms for actuating the framed sets of blades and the cut-off blade comprise similar parts which reduce cost of production of the machine and facilitate assembly, as well as detachment of the blades from the operative mechanism.

Other objects and advantages of the invention will be apparent from the drawings and following description.

In the drawings:

FIG. 4 is a plan view of one of two sets of cutter blades in their frames, detached from the rest of the machine.

FIG. 5 is a vertical sectional view, on an enlarged scale, in the plane of the line 5—5 of FIG. 4, showing also part of the reciprocated shaft which connects the framed set of cutter blades to the drive mechanism.

FIG. 6 is an isometric view of a part of the cutter blade assembly including the two sets of vertically disposed blades and the horizontally disposed cut-off blade, some of the blades being omitted for clarity.

FIG. 7 is an elevational side view, partly in section, in the plane of the line 7—7 of FIG. 3, on an enlarged scale, showing the mechanism which reciprocates the cut-off blade and moves it transversely of the machine to cut off meat previously cut into strips by the upper set of cutter blades.

FIG. 8 is a plan view of the mechanism which reciprocates a framed set of cutter blades.

FIG. 9 is an elevational end view of the parts shown in FIG. 8.

FIG. 10 is a sectional view in the plane of the line 10—10 of FIG. 8.

Figure 1:
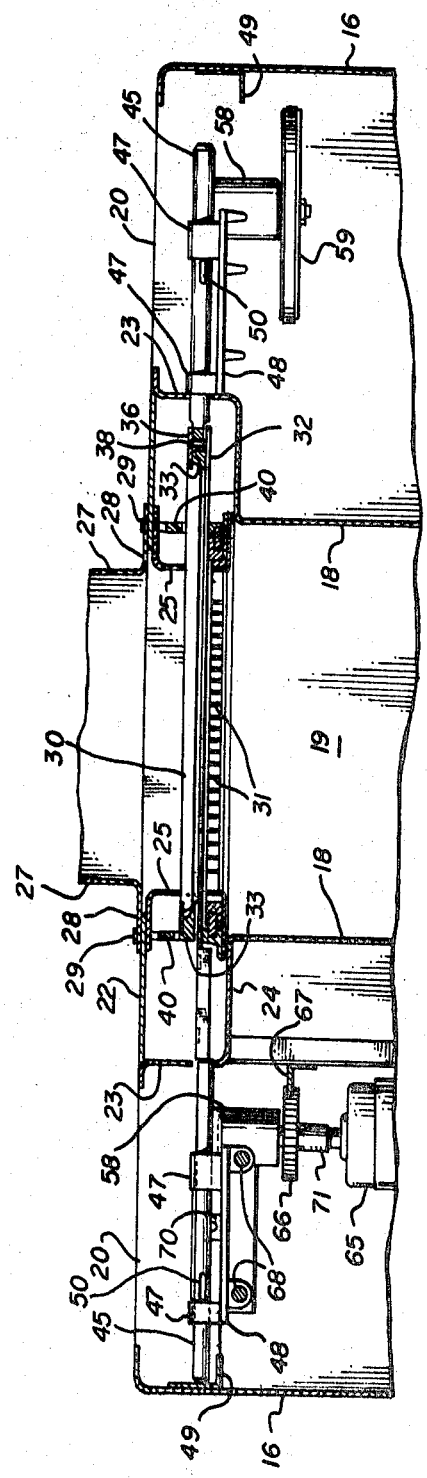
FIG. 1 is a longitudinal vertical sectional view of a meat cubing machine embodying our invention, in the plane of the line 1—1 of FIG. 3, the hopper at the top of the machine and the lower part of the cabinet being broken away.
Figure 2:
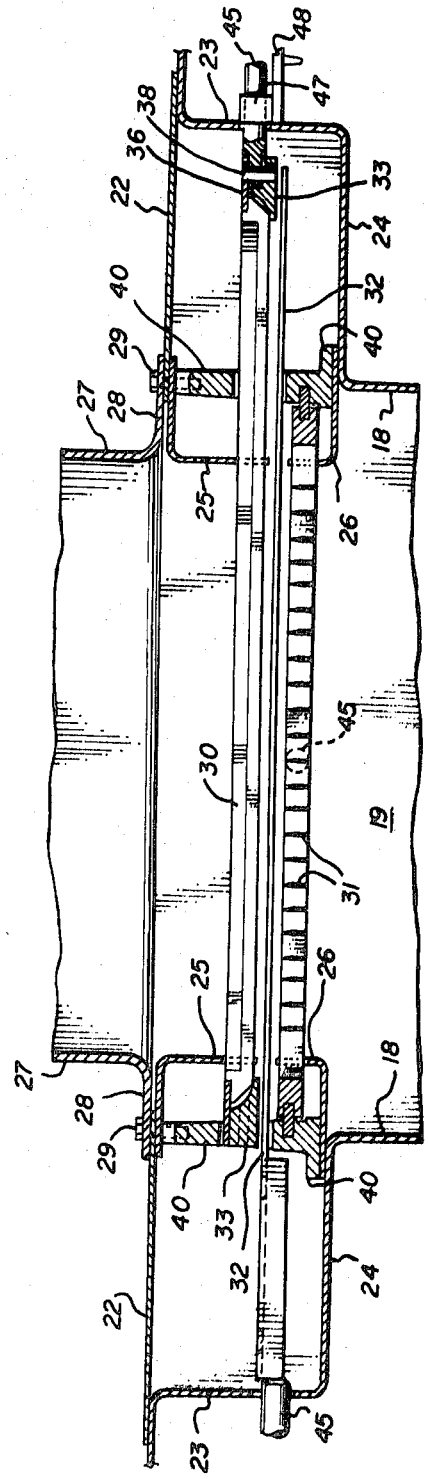
FIG. 2 is a view of the central portion of FIG. 1 on an enlarged scale.

In that embodiment of the invention shown in the drawings, the machine housing comprises a pair of front panels 15, side walls 16, rear wall 17, inner side walls 18, inner rear wall 19 and a top which consists of areas 20 adjacent the side walls 16, 21 adjacent the rear wall 17, and a forward area 22 which covers the cutting chamber. The latter is defined by vertical walls 23, horizontal floor 24 and the cover 22. The chamber thus formed is interiorly divided into a central portion, within which only the cutter portions of blades are housed, and a marginal portion, within which the blade mounting frames are housed. The arrangement is such that only the meat or other material to be cut and the cutter portions of the blades enter the cutter chamber. The interior dividing means in the cutter chamber comprises an upper angle member 25 and lower angle member 26, as shown in FIGS. 1 and 2. The vertical portion 25' at opposite sides of the angle member 25 is slotted upwardly from its lower edge to receive the blades 30 of the upper set of blades, and the vertical portion 26' at opposite ends of the angle member 26 is slotted downwardly from its upper edge to receive the blades 31 of the lower set of blades, as shown in FIGS. 1, 2 and 6. The blades and their mounting will be described in detail hereinafter.

Above the cabinet top is a hopper 27 through which meat passes by gravity to the cutter chamber beneath it. The hopper 27 consists of vertical walls and an outwardly bent flange 28 which is connected by removable pins 29 extending through cover 22 into the horizontal portions of the angle member 25 as shown in FIGS. 1 and 2. The cabinet housing and the cutter chamber cover and wall members are so constructed and arranged that all parts touched by the meat or material to be cut can be removed easily for cleansing. The space beneath the cutter chamber, between the inner side walls 18 and inner rear wall 19 is designed to receive a cubed meat bin (not shown) removable through the open front between the front panels 15.

Referring to FIGS. 4, 5 and 6, the cutter blade assembly includes the upper blades 30, lower blades 31 and an intermediate cut-off blade 32. The upper vertically disposed blades 30, in this embodiment, extend longitudinally of the cabinet between the side walls 23 of the cutter chamber. The lower vertically disposed blades 31, in this embodiment, extend transversely of the cabinet in the cutter chamber, and at right angles to the blades 30, but in a lower plane. Tht cut-off blade 32 is a single double edged, horizontally disposed blade. It may be mounted to move in directions parallel to either set of blades, 30 or 31. The cutting edges of the blades 30 and 31 are the upper edges.

The blades 30 comprising the upper set of blades are parallel to each other, and spaced apart to cut meat into strips of desired width. If one inch cubes are desired, the blades 30 of the upper set will be spaced from each other one inch, and the blades 31 of the lower set will also be spaced apart from each other one inch. The blades of each set are removably mounted in a frame 33 having sides 34 and ends 35 as shown in FIG. 4. The frame ends 35 are slotted inwardly from their upper surfaces to receive the ends of blades 30 in their spaced relationship. The cutting edges of the blades are recessed adjacent their ends as shown in FIG. 5, so that a retainer plate 36 fits in said recessed ends and bears on the upper surface of the frame ends 35. The slots in the frame ends 35 each have a curved surface 37 which prevents binding of the blades in the frame and provides for easy placement and removal of the blades by removal of the pins 38 and retainer plates 36.

As shown in FIGS. 1 and 2, the blade frames 33 are supported by and slidable in bearings 40 which are part of the main frame of the machine and are located adjacent to and outwardly of the upper and lower angle members 25 and 26 which define the cutting chamber.

The mechanism by which the blades frames 33 and blade sets 30 and 31 mounted therein are reciprocated at right angles to each other will be described with reference to FIGS. 3, 8, 9, and 10. Since the actuating mechanisms are alike, except for their locations at right angles to each other, the parts will be designated by similar numerals. Each of the blade frames 33 is connected at one of its ends 35 by pin 38 to an actuator rod 45, slidable in bushings 46 in bearings 47 integral with a casting 48 supported on the machine frame angle 49 attached to the side walls 16 and rear wall 17 of the cabinet. The actuator rod 45 is slotted to receive the head 50 of an actuator arm 51 which is pivotally mounted by a removable pin 52 on the casting 48. The actuator arm 51, when detached from the casting, can be withdrawn by longitudinal movement to disengage the head 50 from the actuator rod 45. Between the head 50 and the pivotal connection 52, a connector arm 54 is pivotally connected at one end by pin 53 to the actuator arm 51. The opposite end of the connector arm 54 is eccentrically connected at 55 to the disc 56 on shaft 57 in sleeve 58, the shaft 57 being rotated by pulley 59. The pulleys 59 of the two mechanisms which reciprocate the rods 45 connected to the two blade frames which hold blades 30 and 31, respectively, are connected to a motor 60 by belts 61. By rotation of the gear 62 on the shaft of the motor 60, the pulleys 59 may be driven at any desired speed to rotate the discs 56 and actuate the connector arms 54, and thereby pivotally move the actuator arms 51 to reciprocate the actuator rods 45 to move the frames 33 of the two sets of blades 30, 31, respectively, in directions at right angles to each other.

The cut-off blade 32 is horizontally disposed between the sets of blades 30, 31, and is reciprocated longitudinally and bodily moved transversely. The reciprocating mechanism for blade 32 is located at the left hand side of FIG. 3. It resembles the parts designated 45–58 inclusive, heretofore described as part of the mechanism employed for reciprocating the two sets of blades 30 and 31. This mechanism comprises the rod 45, actuator arm 51, connector arm 54, and disc 56, mounted on casting 48, together with the connecting means heretofore described.

Figure 3:
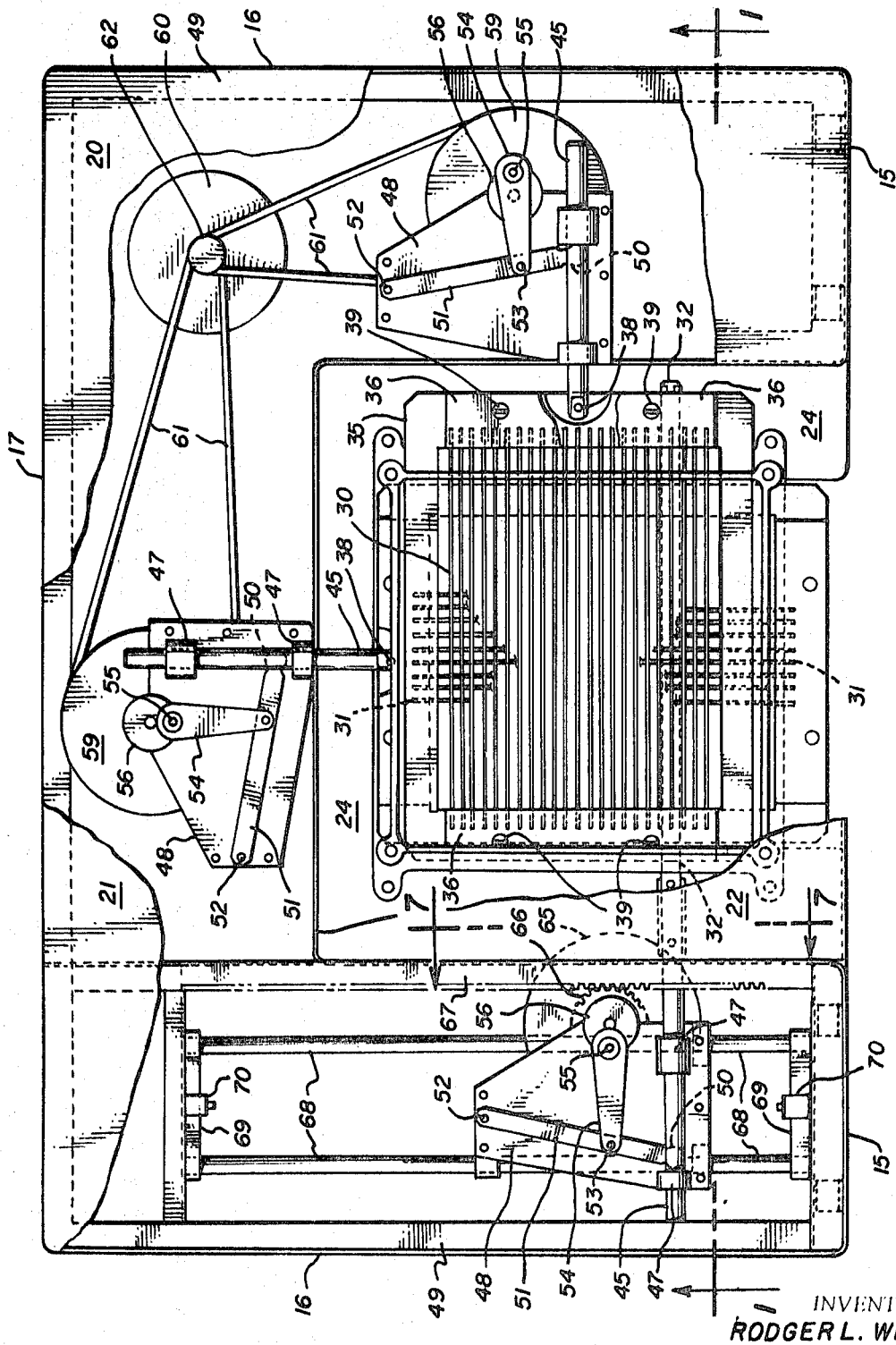
FIG. 3 is a top plan view of the machine with the hopper and upper part of the housing removed.

As shown in FIGS. 3 and 7, the disc 56 is rotated through shaft 57 by a motor 65, for actuating the connector arm 54, pivotally moving the actuator arm 51 and thereby reciprocating the actuator rod 45 to move the cut-off blade 32 longitudinally back and forth. The entire casting 48 and parts mounted thereon for reciprocating the blade 32 have bodily movement imparted thereto by a toothed wheel 66 on shaft 57 which engages the teeth of the rack 67. The casting 48 assembly is mounted on a pair of rods 68 which are parallel and spaced apart from each other, and extend transversely of the machine into a pair of end mounting bars 69 fastened to the frame 49 of the machine. Each of the bars 69 has mounted thereon a button actuated switch 70 contacted by the reciprocating assembly at the limits of its sliding movement on the rods 68 transversely of the machine cabinet. The coupling between the motor 65 and the toothed gear 66 is designated 71.

The operation of the machine will be understood from the foregoing description and the drawings. Summarizing, briefly, a large piece of meat is placed in the hopper 27. It falls by gravity aided manually if desired, onto the upper cutting edges of blades 30, removably mounted in frame 33, reciprocated by motor 60 and operative connections between the motor 60 and actuator rod 45 located, in this embodiment, at the right hand side of FIGS. 1, 2 and 3. This step of the operation cuts the meat into unsevered strips. The meat moves downwardly between the blades 30 and below the horizontal plane of the cut-off blade 32 which is reciprocated longitudinally and moved bodily transversely to sever the previously cut strips which then are supported on the cutting edges of the blades 31 in frame 33. The cut-off blade is reciprocated and bodily moved by the motor 65 and operative connections shown at the lower left hand side of FIGS. 1, 2 and 3. The cut off strips are then cut transversely by the lower set of blades 31 into cubes which fall into a removable bin (not shown) below the cutter chamber, or may be carried away from the machine by conveyor means (not shown) mounted below the cutting chamber between the walls 18.

The cut-off blade 32 and the means for reciprocating it longitudinally and moving it bodily transversely horizontally may be dispensed with under certain conditions. Conventionally, the blades 30, 31 and 32 are located and spaced so as to produce cubes of equal length, width and thickness, but if cubes of different dimensions are desired, and the thickness of the piece of meat to be cubed is acceptable as one dimension of the cubes, then the horizontal cutting operation is unnecessary. For example, if the vertical blades 30 and 31 are spaced apart from each other one inch, and are used to cut vertically through a piece of meat four inches in thickness, without employment of a cut-off blade such as 32, the resultant cubes will be 1 x 1 x 4 inches. For some purposes, such cubes are desired or acceptable, although customarily meat cubed for use in stews or "en brochette" has equal length, width and thickness.

Figure 11:
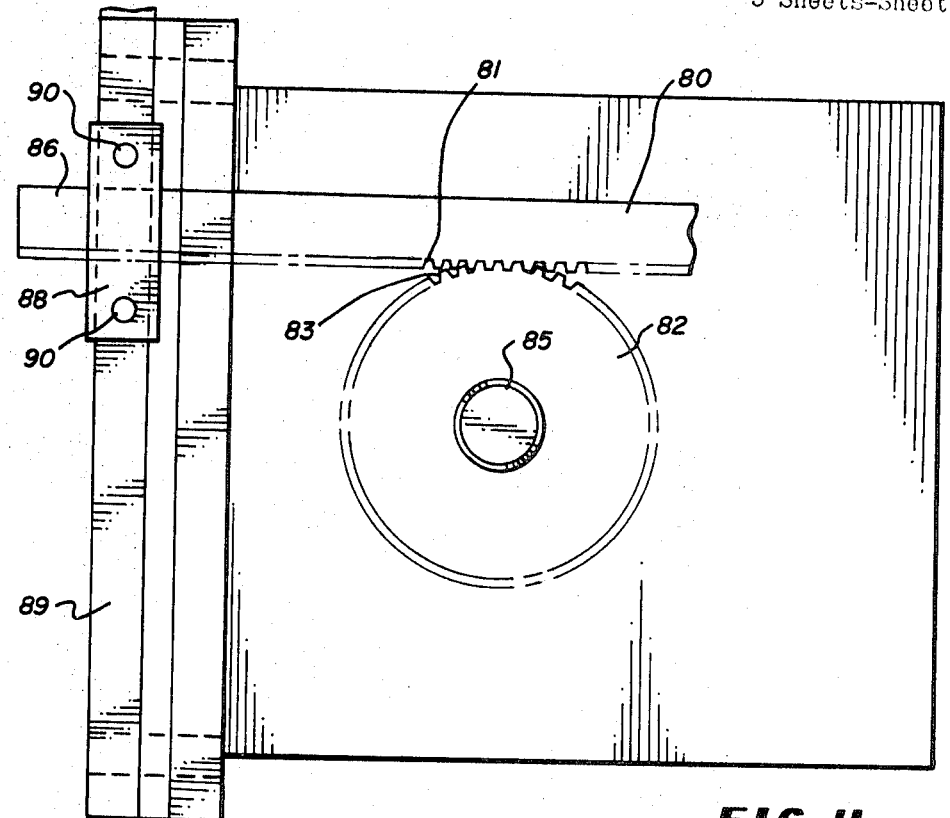
FIG. 11 is an elevational side view showing a modification of the rack bar which is part of the cut-off blade actuating mechanism of FIGS. 3 and 7.
Figure 12:
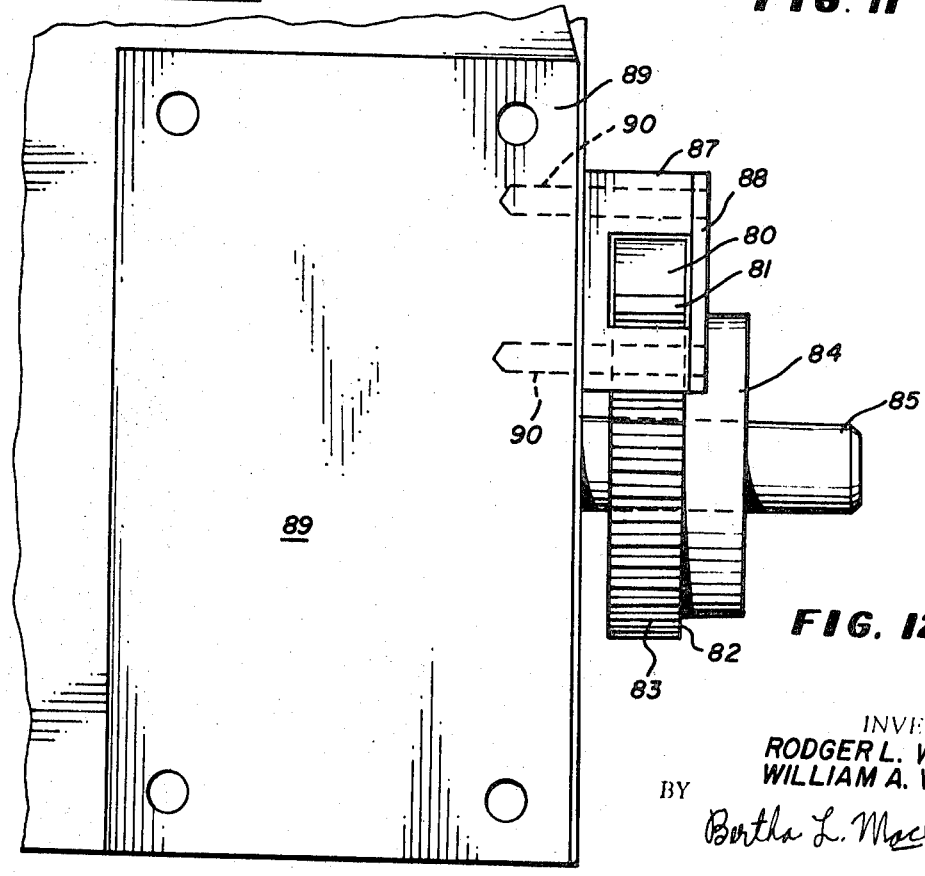
FIG. 12 is an elevational end view of the parts shown in FIG. 11.

Referring to FIGS. 11 and 12, a modification of the rack 67 and mounting means therefor comprises a rack 80 which differs from the rack 67 in that the teeth 81 face downwardly to engage the teeth 83 of the gear 82. The gear 82 and its hub 84 are fixedly mounted on the horizontal shaft 85. In this embodiment, the rearward end of the rack is fastened to the housing, but the forward end 86 is free and supported loosely in a bracket 87 which together with a plate 88 provided a recess for receiving the rack 80. The bracket 87 and plate 88 are fastened to a support 89 by bolts 90. The support 89 is fastened to a fixed part of the housing by any suitable means. The gear 82 and shaft 85 are rotated by the motor 65. Engagement of the gear teeth 83 with the teeth 81 of the rack 80 causes the cut-off blade actuating mechanism to move back and forth by sliding on the rods 68 as heretofore explained in connection with FIGS. 3 and 7. The means for loosely supporting the forward end 86 of the rack obviates possibility of the gear 82 and rack 80 binding in operation.

The location of the cutting blades in the isolated cutting chamber and the location of all the operative parts outside of the cutting chamber, coupled with easy detachment of the parts which require cleansing from the operating mechanism, insures sanitary conditions. The provision of the similar castings 48 and mounting thereon of the similar means for actuating the two sets of cutter blades as well as the cut-off blade has resulted in substantial savings in production costs.

We claim:

1. A cubing machine comprising:
   (a) a housing including interior walls spaced from the housing and defining a cutting chamber,
   (b) first and second framed sets of vertically disposed, transversely spaced apart knife blades, one set above the other, the blades of one set extending longitudinally at right angles to the blades of the other set and positioned in the cutting chamber with their cutting edges upwardly directed and supporting the material to be cut, and
   (c) means located in the housing outside of the cutting chamber operatively and detachably connected to each of said framed sets of blades for reciprocating the blades, said means comprising motor driven mechanism and similar reciprocating mechanisms each including a horizontally disposed casting, an actuator arm pivotally connected to the casting, a slotted actuator rod connected at one end to one of the framed sets of blades, said actuator arm having a head on one end for engagement with the slotted actuator rod, and a connector arm pivotally connected to the actuator arm and to the motor driven mechanism.

2. A cubing machine comprising:
   (a) a housing including interior walls spaced from the housing and defining a cutting chamber,
   (b) first and second framed sets of vertically disposed, transversely spaced apart knife blades, one set above the other, the blades of one set extending longitudinally at right angles to the blades of the other set and positioned in the cutting chamber with their cutting edges upwardly directed and supporting the material to be cut,
   (c) a horizontally disposed double edged blade movable bodily across the cutting chamber, and
   (d) means located in the housing outside of the cutting chamber operatively and detachably connected to each of said framed sets of blades and said double edged blade for reciprocating the blades and for bodily moving the horizontally disposed blade across the cutting chamber, said means for reciprocating and for bodily moving the horizontally disposed blade across the cutting chamber including a pair of horizontally disposed parallel transversely spaced apart rods on which said means are slidably supported, a motor, and operative connections between the motor and said means for reciprocating and moving said horizontal blade, said operative connections comprising a rotated shaft, a gear fixed on the shaft, and a rack engaged by the gear and fastened to the machine housing at one end and free at its opposite end, being loosely supported intermediate its ends.

3. The cubing machine defined by claim 1, in which the actuator arm is detachable from the casting and the actuator arm head can be withdrawn from the slotted actuator rod by longitudinal movement when the actuator arm has been detached from the casting.

4. The cubing machine defined by claim 1, in which the actuator rod is quickly detachable from a framed set of blades.

5. A cubing machine comprising:
   (a) a housing including interior walls spaced from the housing and defining a cutting chamber,
   (b) first and second framed sets of vertically disposed, transversely spaced apart knife blades, one set above the other, the blades of one set extending longitudinally at right angles to the blades of the other set and positioned in the cutting chamber with their cutting edges upwardly directed and supporting the material to be cut, each of said framed sets comprising a plurality of parallel vertical blades recessed at their ends, frame members slotted inwardly from their upper surfaces to receive the ends of the blades, and retainer plates fastened to the frame members covering the recessed ends of the blades, and
   (c) means located in the housing outside of the cutting chamber operatively and detachably connected to each of said framed sets of blades for reciprocating the blades.

6. The cubing machine defined by claim 5, in which the slotted frame members have curved blade bearing surfaces in the slots for preventing binding of the blades in the frames.

7. The cubing machine defined by claim 1, which includes a vertical support provided with a recess extending therethrough, in which the rack is fastened to the machine housing at one end and is free at its opposite end, the rack extending through said support recess and loosely supported intermediate its ends by said support.

8. A cubing machine comprising:
   (a) a housing including interior walls spaced from the housing and defining a cutting chamber,
   (b) first and second framed sets of vertically disposed, transversely spaced apart knife blades, one set above the other, the blades of one set extending longitudinally at right angles to the blades of the other set and positioned in the cutting chamber with their cutting edges upwardly directed and supporting the material to be cut,
   (c) vertically slotted partition members located in the cutting chamber dividing the cutting chamber into a central portion within which only the cutter portions of the blades are housed and a marginal portion within which the blade mounting frames are housed, said partition members being angle form comprising horizontal and vertical portions, the horizontal portions being detachably fastened to the housing, and (d) means located in the housing outside of the cutting chamber operatively and detachably connected to each of said framed sets of blades for reciprocating the blades.

References Cited

UNITED STATES PATENTS

| | | | |
|---|---|---|---|
| 2,327,018 | 8/1943 | Criner | 146—78 |
| 3,506,046 | 4/1970 | Webb | 146—78 |

WILLIE G. ABERCROMBIE, Primary Examiner